(12) United States Patent
Kim et al.

(10) Patent No.: US 10,408,939 B1
(45) Date of Patent: Sep. 10, 2019

(54) LEARNING METHOD AND LEARNING DEVICE FOR INTEGRATING IMAGE ACQUIRED BY CAMERA AND POINT-CLOUD MAP ACQUIRED BY RADAR OR LIDAR CORRESPONDING TO IMAGE AT EACH OF CONVOLUTION STAGES IN NEURAL NETWORK AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/262,984

(22) Filed: Jan. 31, 2019

(51) Int. Cl.
*G01C 3/08* (2006.01)
*G01S 17/89* (2006.01)
*G06K 9/00* (2006.01)
*G06K 9/66* (2006.01)
*G06N 3/08* (2006.01)
(Continued)

(52) U.S. Cl.
CPC ......... *G01S 17/89* (2013.01); *G06K 9/00201* (2013.01); *G06K 9/6256* (2013.01); *G06K 9/66* (2013.01); *G06N 3/08* (2013.01); *G06T 7/521* (2017.01); *G06T 2207/10028* (2013.01)

(58) Field of Classification Search
CPC ........ G01S 17/89; G06K 9/6256; G06K 9/66; G06K 9/00201; G06T 7/521; G06T 2207/10028; G06N 3/08
See application file for complete search history.

(56) References Cited

U.S. PATENT DOCUMENTS 9,886,530 B2 * 2/2018 Mehr ..................... G06F 17/50
2018/0292825 A1 * 10/2018 Smolyanskiy ....... B62D 15/025
(Continued)

*Primary Examiner* — Samantha K Abraham
(74) *Attorney, Agent, or Firm* — Xsensus LLP

(57) ABSTRACT

A method for integrating, at each convolution stage in a neural network, an image generated by a camera and its corresponding point-cloud map generated by a radar, a LiDAR, or a heterogeneous sensor fusion is provided to be used for an HD map update. The method includes steps of: a computing device instructing an initial operation layer to integrate the image and its corresponding original point-cloud map, to generate a first fused feature map and a first fused point-cloud map; instructing a transformation layer to apply a first transformation operation to the first fused feature map, and to apply a second transformation operation to the first fused point-cloud map; and instructing an integration layer to integrate feature maps outputted from the transformation layer, to generate a second fused point-cloud map. By the method, an object detection and a segmentation can be performed more efficiently with a distance estimation.

22 Claims, 5 Drawing Sheets

(51) Int. Cl.
*G06T 7/521* (2017.01)
*G06K 9/62* (2006.01)

(56) References Cited

U.S. PATENT DOCUMENTS

2019/0043201 A1* 2/2019 Strong ................. G06K 9/6228
2019/0045207 A1* 2/2019 Chen ..................... H04N 19/80

* cited by examiner

LEARNING METHOD AND LEARNING DEVICE FOR INTEGRATING IMAGE ACQUIRED BY CAMERA AND POINT-CLOUD MAP ACQUIRED BY RADAR OR LIDAR CORRESPONDING TO IMAGE AT EACH OF CONVOLUTION STAGES IN NEURAL NETWORK AND TESTING METHOD AND TESTING DEVICE USING THE SAME

FIELD OF THE DISCLOSURE

The present disclosure relates to a learning method and a learning device for use with an autonomous vehicle; and more particularly, to the learning method and the learning device for integrating an image acquired by camera and a point-cloud map acquired by a radar of a LiDAR, and a testing method and a testing device using the same.

BACKGROUND OF THE DISCLOSURE

Deep Convolution Neural Networks (Deep CNNs) are at the heart of the remarkable development in deep learning. CNNs have already been used in the 90's to solve problems of character recognition, but their use has become as widespread as it is now thanks to recent researches. These CNNs won the 2012 ImageNet image classification tournament, crushing other competitors. Then, the convolutional neural network became a very useful tool in the field of the machine learning.

Recently, the CNNs have been popular in an autonomous vehicle industry. When used in the autonomous vehicle industry, the CNNs perform functions of acquiring images from a camera installed on a vehicle, searching for lanes, etc.

However, if the CNNs only use videos from the camera, in a certain situation, i.e., a situation where reliability of the videos is not quite good due to foggy or dark weather, safety of autonomous driving cannot be guaranteed. Therefore, use of additional sensors, e.g., at least one radar and/or at least one LiDAR, other than cameras helps to make the autonomous driving safer, however, conventional arts only use them in a simple two-track fashion and just perform separate calculations of information from the cameras and information from the radar and/or the LiDAR for use.

In this case, each of neural networks operates independently, thus inefficiently.

SUMMARY OF THE DISCLOSURE

It is an object of the present disclosure to solve all the aforementioned problems.

It is another object of the present disclosure to provide a method for integrating, at each convolution stage in a neural network, at least one image generated by at least one camera and its corresponding at least one point-cloud map generated by at least one radar or at least one LiDAR.

In accordance with one aspect of the present disclosure, there is provided a method for integrating, at each convolution stage in a neural network, at least one image generated by at least one camera and its corresponding at least one point-cloud map generated by at least one radar or at least one LiDAR, including steps of: (a) a computing device instructing at least one initial operation layer to integrate at least one original image generated by the camera and its corresponding at least one original point-cloud map generated by the radar or the LiDAR, to thereby generate (i) at least one first fused feature map by adding depth information included in the original point-cloud map to the original image and (ii) at least one first fused point-cloud map by adding color information included in the original image to the original point-cloud map; (b) the computing device instructing at least one transformation layer to generate a (1_1)-st intermediate feature map by applying at least one first transformation operation to the first fused feature map, and to generate a (1_2)-nd intermediate feature map by applying at least one second transformation operation to the first fused point-cloud map; and (c) the computing device instructing at least one integration layer to generate a second fused feature map by integrating the (1_1)-st intermediate feature map and the (1_2)-nd intermediate feature map, and to generate a second fused point-cloud map by applying at least one mapping operation to the second fused feature map.

As one example, the method further includes a step of: (d) the computing device, as a result of repeating the steps of (b) and (c), (i) instructing the transformation layer to generate an (N_1)-st intermediate feature map by applying the first transformation operation to an N-th fused feature map created by the integration layer, to generate an (N_2)-nd intermediate feature map by applying the second transformation operation to an N-th fused point-cloud map created by the integration layer, and (ii) instructing the integration layer to generate an (N+1)-th fused feature map by integrating the (N_1)-st intermediate feature map and the (N_2)-nd intermediate feature map, and to generate an (N+1)-th fused point-cloud map by applying the mapping operation to the (N+1)-th fused feature map.

As one example, the method further includes a step of: (e) the computing device instructing at least one output layer to perform at least part of operations required for autonomous driving which include at least part of an object detection, a semantic segmentation and a depth estimation, by referring to at least part of the (N+1)-th fused feature map and the (N+1)-th fused point-cloud map.

As one example, the method further includes a step of: (f) the computing device, if at least one output of the neural network created by the output layer is generated, learning at least part of one or more parameters of the neural network by referring to the output and its at least one corresponding GT.

As one example, at the step of (a), the first fused feature map includes (i) original color information, on each pixel, in the original image, and (ii) the depth information on the each pixel, generated by referring to original coordinate information on each position in a three dimensional space near the radar or the LiDAR wherein the each position is included in the original point-cloud map, and the first fused point-cloud map includes (i) the original coordinate information and (ii) the color information on the each position acquired by referring to the original color information.

As one example, at the step of (b), the (1_1)-st intermediate feature map is generated by applying the first transformation operation including at least one convolution operation to the first fused feature map.

As one example, at the step of (b), the (1_1)-st intermediate feature map is generated by applying the first transformation operation further including at least one ReLU operation and at least one pooling operation to the first fused feature map.

As one example, at the step of (b), the (1_2)-nd intermediate feature map is generated by applying the second transformation operation including at least one neural network operation, at least one inverse mapping operation, and at least one convolution operation to the first fused point-cloud map, wherein the inverse mapping operation correlates (i) the depth information, included in the first fused point-cloud map, in a form of three dimensional coordinates linked with the color information with (ii) each of features in the (1_1)-st intermediate feature map.

As one example, at the step of (c), the second fused feature map is generated by concatenating the (1_1)-st intermediate feature map and the (1_2)-nd intermediate feature map in a direction of a channel.

As one example, at the step of (c), the mapping operation correlates (i) each of feature values in the second fused feature map with (ii) each position in a three dimensional space near the radar or the LiDAR.

In accordance with another aspect of the present disclosure, there is provided a method for testing and using integration of, at each convolution stage in a neural network, at least one image generated by at least one camera and its corresponding at least one point-cloud map generated by at least one radar or at least one LiDAR, including steps of: (a) a testing device, on condition that (1) a learning device has performed processes of instructing at least one initial operation layer to integrate at least one original training image generated by the camera and its corresponding at least one original point-cloud map for training generated by the radar or the LiDAR, to thereby generate (i) at least one first fused feature map for training by adding depth information for training included in the original point-cloud map for training to the original training image and (ii) at least one first fused point-cloud map for training by adding color information for training included in the original training image to the original point-cloud map for training, (2) the learning device has performed processes of instructing at least one transformation layer to generate a (1_1)-st intermediate feature map for training by applying at least one first transformation operation to the first fused feature map for training, and to generate a (1_2)-nd intermediate feature map for training by applying at least one second transformation operation to the first fused point-cloud map for training, (3) the learning device has performed processes of instructing at least one integration layer to generate a second fused feature map for training by integrating the (1_1)-st intermediate feature map for training and the (1_2)-nd intermediate feature map for training, and to generate a second fused point-cloud map for training by applying at least one mapping operation to the second fused feature map for training, (4) the learning device, as a result of repeating the steps of (2) and (3), has performed processes of (i) instructing the transformation layer to generate an (N_1)-st intermediate feature map for training by applying the first transformation operation to an N-th fused feature map for training created by the integration layer, to generate an (N_2)-nd intermediate feature map for training by applying the second transformation operation to an N-th fused point-cloud map for training created by the integration layer, (ii) instructing the integration layer to generate an (N+1)-th fused feature map for training by integrating the (N_1)-st intermediate feature map for training and the (N_2)-nd intermediate feature map for training, and to generate an (N+1)-th fused point-cloud map for training by applying the mapping operation to the (N+1)-th fused feature map for training, (5) the learning device has performed processes of instructing at least one output layer to perform at least part of operations required for autonomous driving which include at least part of an object detection, a semantic segmentation and a depth estimation, by referring to at least part of the (N+1)-th fused feature map for training and the (N+1)-th fused point-cloud map for training, and (6) the learning device has learned at least part of one or more parameters of the neural network by referring to at least one output of the neural network created by the output layer and at least one GT corresponding to the output; instructing the initial operation layer to integrate at least one original test image generated by the camera and its corresponding at least one original point-cloud map for testing generated by the radar or the LiDAR, to thereby generate (i) at least one first fused feature map for testing by adding depth information for testing included in the original point-cloud map for testing to the original test image and (ii) at least one first fused point-cloud map for testing by adding color information for testing included in the original test image to the original point-cloud map for testing; (b) the testing device instructing the transformation layer to generate a (1_1)-st intermediate feature map for testing by applying the first transformation operation to the first fused feature map for testing, and to generate a (1_2)-nd intermediate feature map for testing by applying the second transformation operation to the first fused point-cloud map for testing; (c) the testing device instructing the integration layer to generate a second fused feature map for testing by integrating the (1_1)-st intermediate feature map for testing and the (1_2)-nd intermediate feature map for testing, and to generate a second fused point-cloud map for testing by applying the mapping operation to the second fused feature map for testing; (d) the testing device, as a result of repeating the steps of (b) and (c), (i) instructing the transformation layer to generate an (N_1)-st intermediate feature map for testing by applying the first transformation operation to an N-th fused feature map for testing created by the integration layer, to generate an (N_2)-nd intermediate feature map for testing by applying the second transformation operation to an N-th fused point-cloud map for testing created by the integration layer, (ii) instructing the integration layer to generate an (N+1)-th fused feature map for testing by integrating the (N_1)-st intermediate feature map for testing and the (N_2)-nd intermediate feature map for testing, and to generate an (N+1)-th fused point-cloud map for testing by applying the mapping operation to the (N+1)-th fused feature map for testing; and (e) the testing device instructing the output layer to perform at least part of operations required for autonomous driving which include at least part of the object detection, the semantic segmentation and the depth estimation, by referring to at least part of the (N+1)-th fused feature map for testing and the (N+1)-th fused point-cloud map for testing.

In accordance with still another aspect of the present disclosure, there is provided a computing device for integrating, at each convolution stage in a neural network, at least one image generated by at least one camera and its corresponding at least one point-cloud map generated by at least one radar or at least one LiDAR, including: at least one memory that stores instructions; and at least one processor configured to execute the instructions to: perform processes of (I) instructing at least one initial operation layer to integrate at least one original image generated by the camera and its corresponding at least one original point-cloud map generated by the radar or the LiDAR, to thereby generate (i) at least one first fused feature map by adding depth information included in the original point-cloud map to the original image and (ii) at least one first fused point-cloud map by adding color information included in the original image to the original point-cloud map, (II) instructing at least one transformation layer to generate a (1_1)-st intermediate feature map by applying at least one first transformation operation to the first fused feature map, and to generate a (1_2)-nd intermediate feature map by applying at least one second transformation operation to the first fused point-cloud map, and (III) instructing at least one integration layer to generate a second fused feature map by integrating the (1_1)-st intermediate feature map and the (1_2)-nd intermediate feature map, and to generate a second fused point-cloud map by applying at least one mapping operation to the second fused feature map.

As one example, the processor further performs a process of (IV), as a result of repeating the processes of (II) and (III), (i) instructing the transformation layer to generate an (N_1)-st intermediate feature map by applying the first transformation operation to an N-th fused feature map created by the integration layer, to generate an (N_2)-nd intermediate feature map by applying the second transformation operation to an N-th fused point-cloud map created by the integration layer, and (ii) instructing the integration layer to generate an (N+1)-th fused feature map by integrating the (N_1)-st intermediate feature map and the (N_2)-nd intermediate feature map, and to generate an (N+1)-th fused point-cloud map by applying the mapping operation to the (N+1)-th fused feature map.

As one example, the processor further performs a process of (V) instructing at least one output layer to perform at least part of operations required for autonomous driving which include at least part of an object detection, a semantic segmentation and a depth estimation, by referring to at least part of the (N+1)-th fused feature map and the (N+1)-th fused point-cloud map.

As one example, the processor further performs a process of (VI), if at least one output of the neural network created by the output layer is generated, learning at least part of one or more parameters of the neural network by referring to the output and its at least one corresponding GT.

As one example, at the process of (I), the first fused feature map includes (i) original color information, on each pixel, in the original image, and (ii) the depth information on the each pixel, generated by referring to original coordinate information on each position in a three dimensional space near the radar or the LiDAR wherein the each position is included in the original point-cloud map, and the first fused point-cloud map includes (i) the original coordinate information and (ii) the color information on the each position acquired by referring to the original color information.

As one example, at the process of (II), the (1_1)-st intermediate feature map is generated by applying the first transformation operation including at least one convolution operation to the first fused feature map.

As one example, at the process of (II), the (1_1)-st intermediate feature map is generated by applying the first transformation operation further including at least one ReLU operation and at least one pooling operation to the first fused feature map.

As one example, at the process of (II), the (1_2)-nd intermediate feature map is generated by applying the second transformation operation including at least one neural network operation, at least one inverse mapping operation, and at least one convolution operation to the first fused point-cloud map, wherein the inverse mapping operation correlates (i) the depth information, included in the first fused point-cloud map, in a form of three dimensional coordinates linked with the color information with (ii) each of features in the (1_1)-st intermediate feature map.

As one example, at the process of (III), the second fused feature map is generated by concatenating the (1_1)-st intermediate feature map and the (1_2)-nd intermediate feature map in a direction of a channel.

As one example, at the process of (III), the mapping operation correlates (i) each of feature values in the second fused feature map with (ii) each position in a three dimensional space near the radar or the LiDAR.

In accordance with still yet another aspect of the present disclosure, there is provided a testing device for testing and using integration of, at each convolution stage in a neural network, at least one image generated by at least one camera and its corresponding at least one point-cloud map generated by at least one radar or at least one LiDAR, including: at least one memory that stores instructions; and at least one processor, on condition that (1) a learning device has performed processes of instructing at least one initial operation layer to integrate at least one original training image generated by the camera and its corresponding at least one original point-cloud map for training generated by the radar or the LiDAR, to thereby generate (i) at least one first fused feature map for training by adding depth information for training included in the original point-cloud map for training to the original training image and (ii) at least one first fused point-cloud map for training by adding color information for training included in the original training image to the original point-cloud map for training, (2) the learning device has performed processes of instructing at least one transformation layer to generate a (1_1)-st intermediate feature map for training by applying at least one first transformation operation to the first fused feature map for training, and to generate a (1_2)-nd intermediate feature map for training by applying at least one second transformation operation to the first fused point-cloud map for training, (3) the learning device has performed processes of instructing at least one integration layer to generate a second fused feature map for training by integrating the (1_1)-st intermediate feature map for training and the (1_2)-nd intermediate feature map for training, and to generate a second fused point-cloud map for training by applying at least one mapping operation to the second fused feature map for training, (4) the learning device, as a result of repeating the steps of (2) and (3), has performed processes of (i) instructing the transformation layer to generate an (N_1)-st intermediate feature map for training by applying the first transformation operation to an N-th fused feature map for training created by the integration layer, to generate an (N_2)-nd intermediate feature map for training by applying the second transformation operation to an N-th fused point-cloud map for training created by the integration layer, (ii) instructing the integration layer to generate an (N+1)-th fused feature map for training by integrating the (N_1)-st intermediate feature map for training and the (N_2)-nd intermediate feature map for training, and to generate an (N+1)-th fused point-cloud map for training by applying the mapping operation to the (N+1)-th fused feature map for training, (5) the learning device has performed processes of instructing at least one output layer to perform at least part of operations required for autonomous driving which include at least part of an object detection, a semantic segmentation and a depth estimation, by referring to at least part of the (N+1)-th fused feature map for training and the (N+1)-th fused point-cloud map for training, and (6) the learning device has learned at least part of one or more parameters of the neural network by referring to at least one output of the neural network created by the output layer and at least one GT corresponding to the output; configured to execute the instructions to: perform processes of (I) instructing the initial operation layer to integrate at least one original test image generated by the camera and its corresponding at least one original point-cloud map for testing generated by the radar or the LiDAR, to thereby generate (i) at least one first fused feature map for testing by adding depth information for testing included in the original point-cloud map for testing to the original test image and (ii) at least one first fused point-cloud map for testing by adding color information for testing included in the original test image to the original point-cloud map for testing, (II) instructing the transformation layer to generate a (1_1)-st intermediate feature map for testing by applying the first transformation operation to the first fused feature map for testing, and to generate a (1_2)-nd intermediate feature map for testing by applying the second transformation operation to the first fused point-cloud map for testing, (III) instructing the integration layer to generate a second fused feature map for testing by integrating the (1_1)-st intermediate feature map for testing and the (1_2)-nd intermediate feature map for testing, and to generate a second fused point-cloud map for testing by applying the mapping operation to the second fused feature map for testing, (IV) as a result of repeating the processes of (II) and (III), (i) instructing the transformation layer to generate an (N_1)-st intermediate feature map for testing by applying the first transformation operation to an N-th fused feature map for testing created by the integration layer, to generate an (N_2)-nd intermediate feature map for testing by applying the second transformation operation to an N-th fused point-cloud map for testing created by the integration layer, (ii) instructing the integration layer to generate an (N+1)-th fused feature map for testing by integrating the (N_1)-st intermediate feature map for testing and the (N_2)-nd intermediate feature map for testing, and to generate an (N+1)-th fused point-cloud map for testing by applying the mapping operation to the (N+1)-th fused feature map for testing, and (V) instructing the output layer to perform at least part of operations required for autonomous driving which include at least part of the object detection, the semantic segmentation and the depth estimation, by referring to at least part of the (N+1)-th fused feature map for testing and the (N+1)-th fused point-cloud map for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION OF THE PREFERRED EMBODIMENTS

Figure 1:
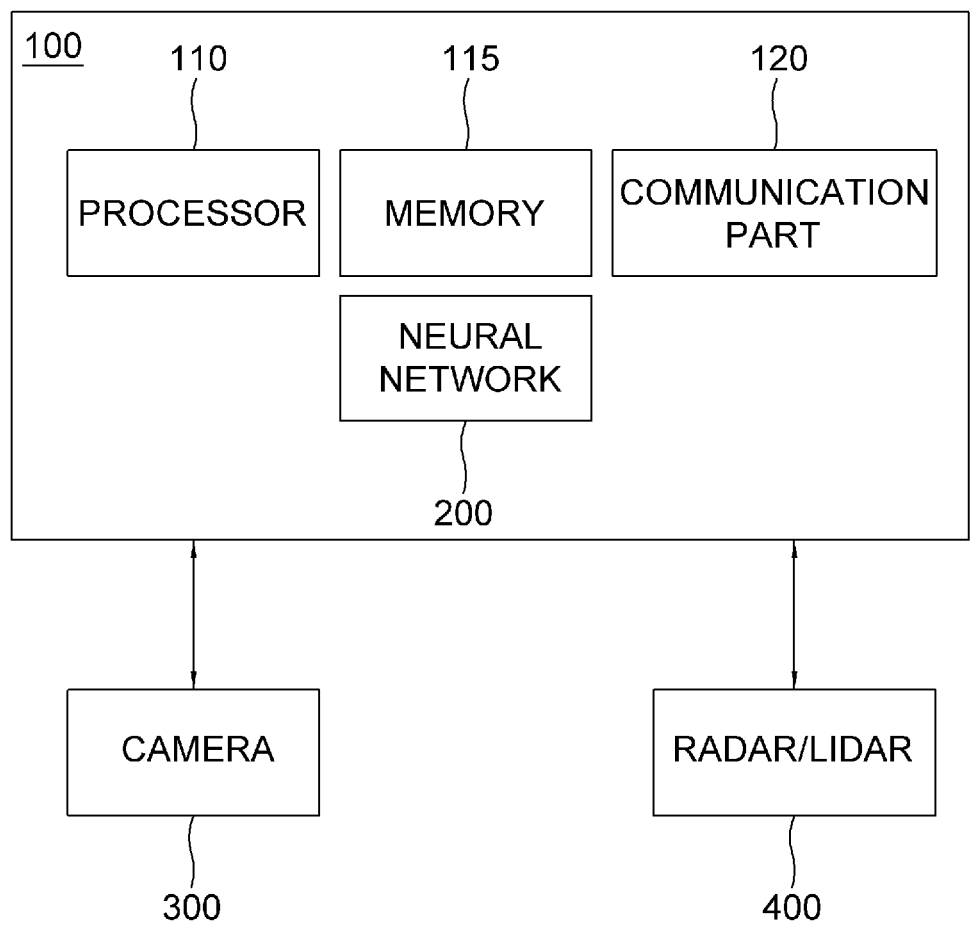
FIG. 1 is a drawing schematically illustrating a configuration of a computing device performing a method for integrating, at each convolution stage in a neural network, at least one image generated by at least one camera and its corresponding at least one point-cloud map generated by at least one radar or at least one LiDAR, in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a configuration of a computing device performing a method for integrating, at each convolution stage in a neural network, at least one image generated by at least one camera and its corresponding at least one point-cloud map generated by at least one radar or at least one LiDAR, in accordance with one example embodiment of the present disclosure.

By referring to FIG. 1, the computing device 100 may include the neural network 200 to be described in detail later. Processes of input, output and computation of the neural network 200 and layers included therein may be respectively performed by a communication part 110 and a processor 120. However, detailed communication schematics between the communication part 110 and the processor 120 is omitted in FIG. 1. Herein, a memory 115 may have stored various instructions to be described later, and the processor 120 may execute the instructions stored in the memory 115 and may perform processes of the present disclosure by executing the instructions. Such description of the computing device 100 does not exclude an integrated device including any combination of a processor, a memory, a medium, or any other computing components.

Also, by referring to FIG. 1, the computing device 100 may acquire data via (i) at least one camera 300 and (ii) at least one radar or at least one LiDAR 400. This is not limited to acquisition of the data by the computing device 100 via the camera 300 and the radar/LiDAR 400, in real-time. Especially, if the computing device 100 performs a learning process to be described later, the computing device 100 may acquire (i) at least one original image for training in a form of the data generated by the camera 300, and (ii) at least one original point-cloud map for training in a form of the data generated by the radar/LiDAR 400, from any external source other than the camera 300 and the radar/LiDAR 400.

A general configuration of the computing device 100 is described above, and a structure of the neural network 200, a vital part of the configuration, is described below by referring to FIG. 2.

Figure 2:
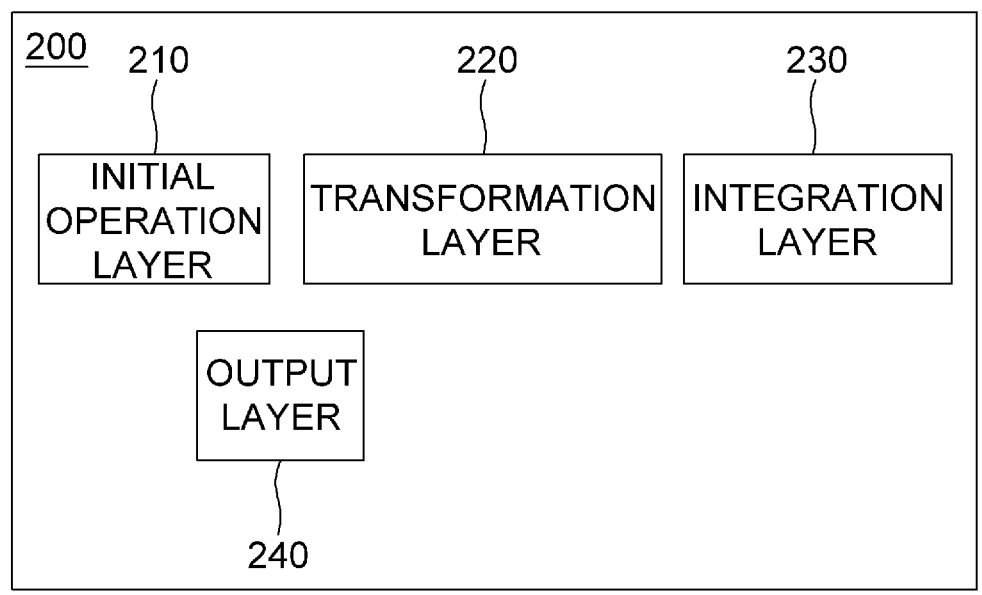
FIG. 2 is a drawing schematically illustrating a configuration of the neural network performing the method for integrating, at each convolution stage in the neural network, the image generated by the camera and its corresponding point-cloud map generated by the radar or the LiDAR, in accordance with one example embodiment of the present disclosure.

FIG. 2 is a drawing schematically illustrating a configuration of the neural network 200 performing the method for integrating, at each convolution stage in the neural network 200, the image generated by the camera 300 and its corresponding point-cloud map generated by the radar/LiDAR 400, in accordance with one example embodiment of the present disclosure.

By referring to FIG. 2, the neural network 200 may include at least one initial operation layer 210, at least one transformation layer 220, at least one integration layer 230, and at least one output layer 240. Each of roles of each of the layers will be described in detail along with an integration method in accordance with one example embodiment of the present disclosure.

Components of the present disclosure are described above, and the integration method in accordance with one example embodiment of the present disclosure will be described in detail, however, notation unique to the present disclosure is explained below.

In the figures and description below, a notation in a form of [A, B] and that in a form of [C, D, E] may be used. Herein, [A, B] is used for representing the point-cloud map, and [C, D, E] is used for representing the image or a feature map. In detail, in [A, B] notation, B may mean the number of coordinates included in the point-cloud map, and A may mean the number of channels of values corresponding to each of the coordinates. For example, if the point-cloud map is represented by [3, M], then there are M coordinates in the point-cloud map, and each of the M coordinates is linked with values of its corresponding three channels. In [C, D, E] notation, D may mean the number of feature values in a direction of a first axis in the image or the feature map, and E may mean the number of the feature values in a direction of a second axis in the image or the feature map. C may mean the number of the channels of each of the feature values included in the feature map. The first axis and the second axis may be the y-axis and the x-axis, or any other axes to represent coordinates. For example, if the feature map is represented by [4, h, w], w may be the number of pixels in a direction of the x-axis of the feature map, h may be the number of pixels in a direction of the y-axis thereof, and 4 may be the number of its channels.

Also, there are at least one mapping operation and at least one inverse mapping operation to be described in detail later. Herein, the mapping operation may transform the data in a form of the feature map into the data in a form of the point-cloud map, and conversely, the inverse mapping operation may transform the data in the form of the point-cloud map into the data in the form of the feature map.

The integration method in accordance with one example embodiment of the present disclosure is described below by referring to FIGS. 3, 4, and 5.

Figure 3:
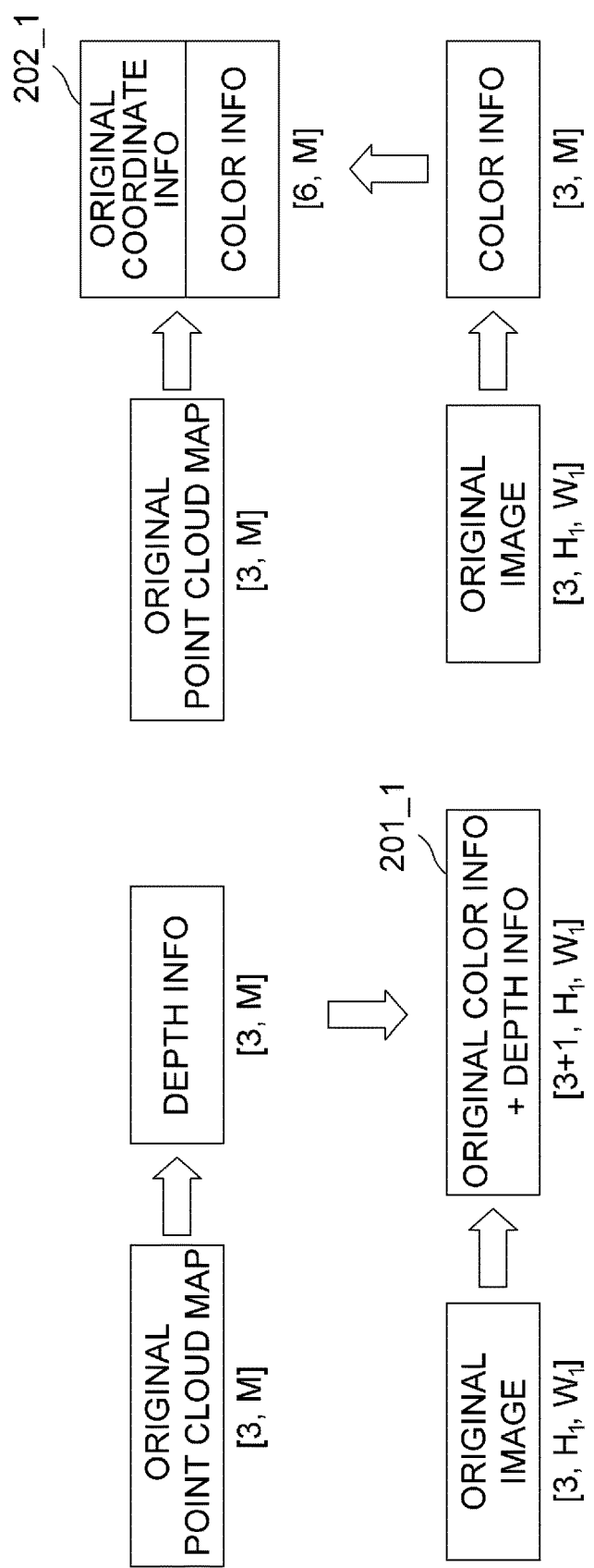
FIG. 3 is a drawing schematically illustrating a first fused feature map and a first fused point-cloud map generated by at least one initial operation layer performing the method for integrating, at each convolution stage in the neural network, the image generated by the camera and its corresponding point-cloud map generated by the radar or the LiDAR, in accordance with one example embodiment of the present disclosure.

FIG. 3 is a drawing schematically illustrating at least one first fused feature map and at least one first fused point-cloud map generated by the initial operation layer 210 performing the method for integrating, at each convolution stage in the neural network 200, the image generated by the camera 300 and its corresponding point-cloud map generated by the radar or the LiDAR 400, in accordance with one example embodiment of the present disclosure.

By referring to FIG. 3, the computing device 100 may instruct the initial operation layer 210 to acquire and integrate the original image and the original point-cloud map, to thereby generate the first fused feature map 201_1 and the first fused point-cloud map 202_1. The original image and the original point-cloud map may be directly acquired from the camera 300 and the radar/LiDAR 400, or acquired as data for training from any external source.

To explain a generation process of the first fused feature map 201_1 in detail, the initial operation layer 210 may correlate each pixel in the original image with each of coordinates in the original point-cloud map. Thereafter, by referring to original coordinate information, corresponding to said each pixel in the original image, included in the original point-cloud map, depth information on said each pixel in the original image may be generated. Then, the initial operation layer 210 may generate the first fused feature map 201_1 by adding the depth information to original color information corresponding to said each pixel. That is, the first fused feature map 201_1 may be same as the original image with an added channel of depth and with the depth information corresponding to said each pixel added to the channel. Using the notation aforementioned, the first fused feature map 201_1 may have a form of [4, $h_1$, $w_1$] with a channel including the depth information added to the original image in a form of [3, $h_1$, $w_1$].

Next, on the generation process of the first fused point-cloud map 202_1, if the original point-cloud map is in a form of [3, M], the initial operation layer 210 may correlate each pixel in the original image in a form of [3, $h_1$, $w_1$] with M coordinates in the original point-cloud map, and then add color information, corresponding to each of the M coordinates, acquired by referring to the original color information included in the original image to the original point-cloud map, to thereby generate the first fused point-cloud map 202_1. Herein, the first fused point-cloud map 202_1 may be in a form of [6, M], because each piece of the color information corresponding to each of the M coordinates is added to each piece of the original coordinate information.

Figure 4:
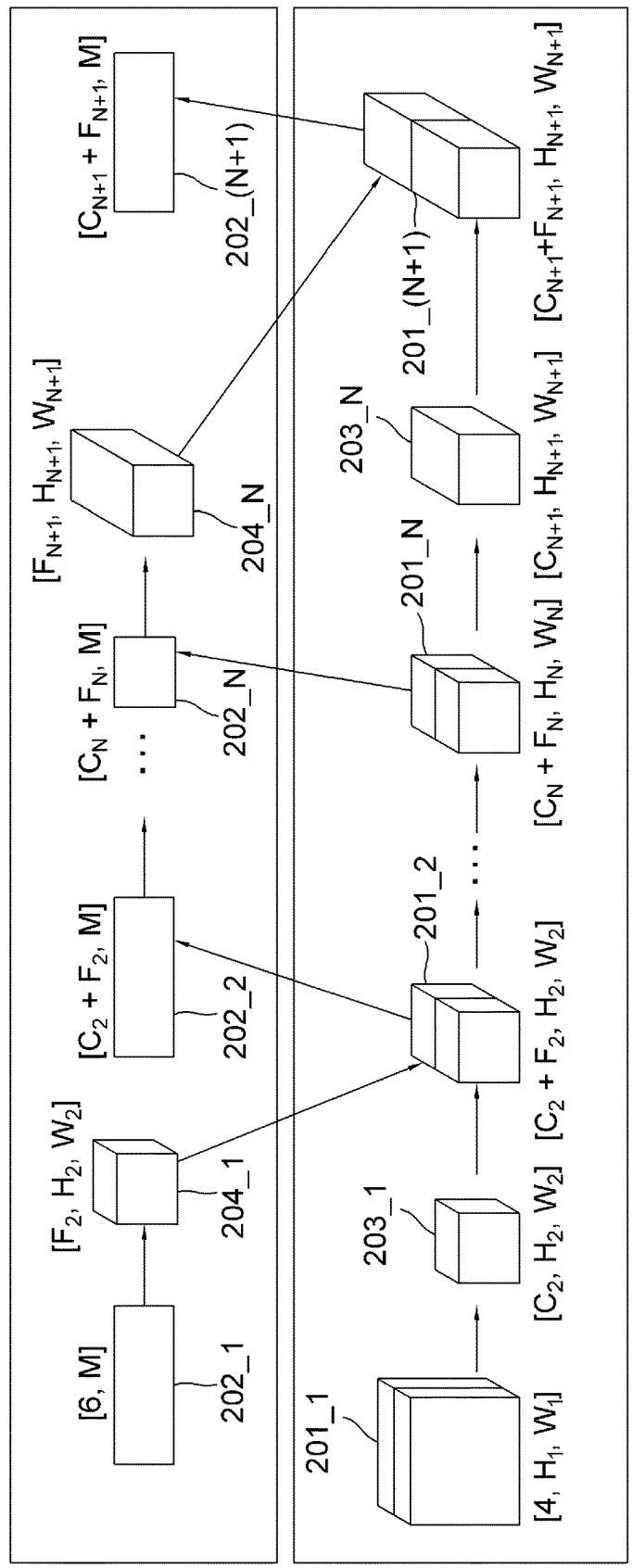
FIG. 4 is a drawing schematically illustrating an example of integrating, at each convolution stage in the neural network, the image generated by the camera and its corresponding point-cloud map generated by the radar or the LiDAR, in accordance with one example embodiment of the present disclosure.

Further, by referring to FIG. 4, if the first fused feature map 201_1 and the first fused point-cloud map 202_1 are generated as such, the computing device 100 may instruct the transformation layer 220 to generate a (1_1)-st intermediate feature map 203_1 by applying at least one first transformation operation to the first fused feature map 201_1, and to generate a (1_2)-nd intermediate feature map 204_1 by applying at least one second transformation operation to the first fused point-cloud map 202_1.

In one example embodiment, intermediate feature maps are generated in pairs at each convolution stage in the neural network 200.

Herein, the first transformation operation may include at least one convolution operation, and may further include at least one ReLU operation and at least one pooling operation. The first fused feature map 201_1 in a form of [4, $h_1$, $w_1$] may be transformed into the (1_1)-st intermediate feature map 203_1 in a form of [$c_2$, $h_2$, $w_2$] by the first transformation operation. Due to the convolution operation which decreases a size of the feature map and increases the number of channels thereof, $h_2$ and $w_2$ may be smaller than $h_1$ and $w_1$ respectively, and $c_2$ may be larger than 4.

And the second transformation operation may transform the first fused point-cloud map 202_1 into the (1_2)-nd intermediate feature map 204_1. This is explained by referring to FIG. 5.

Figure 5:
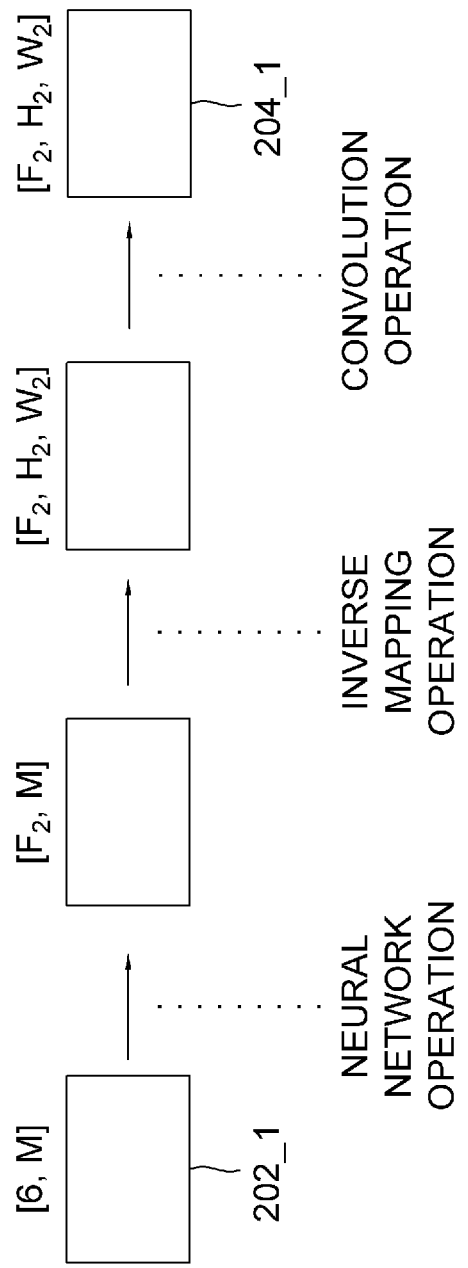
FIG. 5 is a drawing schematically illustrating a second transformation operation as part of the method for integrating, at each convolution stage in the neural network, the image generated by the camera and its corresponding point-cloud map generated by the radar or the LiDAR, in accordance with one example embodiment of the present disclosure.

FIG. 5 is a drawing schematically illustrating the second transformation operation as part of the method for integrating, at each convolution stage in the neural network 200, the image generated by the camera 300 and its corresponding point-cloud map generated by the radar/LiDAR 400, in accordance with one example embodiment of the present disclosure.

The second transformation operation may include at least one neural network operation, at least one inverse mapping operation, and at least one convolution operation. The neural network operation may transform the first fused point-cloud map 202_1 in a form of [6, M] into a temporary point-cloud map in a form of [$f_2$, M]. The purpose of this process is to determine the number of channels of an (N+1)-th fused feature map and an (N+1)-th fused point-cloud map to be inputted into the output layer 240, according to the function of the output layer 240 to be described. Therefore, $f_2$ may be larger or smaller than 6. As such, the neural network operation may change the number of the channels correlated with each of the coordinates.

Thereafter, the inverse mapping operation aforementioned may be applied to the temporary point-cloud map. The inverse mapping operation may transform information, in a form of 3D coordinates linked with the color information, included in the first fused point-cloud map 202_1 into the feature map having lengths in directions of the first axis and the second axis same as those of the (1_1)-st intermediate feature map 203_1. Using the notation aforementioned, the temporary point-cloud map may be in a form of [$f_2$, M], and this will be transformed into a temporary feature map in a form of [$f_2$, $h_2$, $w_2$]. A length in the direction of the first axis and a length in the direction of the second axis are $h_2$ and $w_2$ respectively, which are same as those of the (1_1)-st intermediate feature map 203_1, this is for simplifying concatenation per each of the channels to be described later. However, the inverse mapping operation transforms the temporary point-cloud map such that the temporary point-cloud map corresponds to a size of the (1_1)-st intermediate feature map 203_1 whose size is reduced due to the convolution operation aforementioned, thus the number of the feature values may be less than the number of the coordinates included in the temporary point-cloud map. In this case, multiple values corresponding to multiple coordinates included in the temporary point-cloud map may correspond to a single feature value, and herein, the average over said multiple values may be used as the very single feature value.

And additionally, the convolution operation may be applied to the temporary feature map. This is to output values of the temporary feature map that cannot be calculated from values of the temporary point-cloud map when the values of the temporary point-cloud map are inversely mapped onto the temporary feature map. That is, after the values of the temporary point-cloud map are inversely mapped onto the temporary feature map, non-existent feature values may be generated with smooth representation by the convolution operation. Herein, in the course of transformation of the temporary feature map into the (1_2)-nd intermediate feature map 204_1 by the convolution operation, the size or the number of the channels does not change, thus the (1_2)-nd intermediate feature map 204_1 may be in a form of [$f_2$, $h_2$, $w_2$] same as that of the temporary feature map.

If the (1_2)-nd intermediate feature map 204_1 is generated by the second transformation operation, the computing device 100 may instruct the integration layer 230 to generate a second fused feature map 201_2 by integrating the (1_1)-st intermediate feature map 203_1 and the (1_2)-nd intermediate feature map 204_1, and to generate a second fused point-cloud map 202_2 by applying the mapping operation to the second fused feature map 201_2.

Herein, the second fused feature map 201_2 may be generated by concatenating the (1_1)-st intermediate feature map 203_1 and the (1_2)-nd intermediate feature map 204_1 in a direction of the channel. As a result of the concatenation in the direction of the channel, the second fused feature map 201_2 in a form of [$c_2+f_2$, $h_2$, $w_2$] may be generated by integrating the (1_1)-st intermediate feature map 203_1 in a form of [$c_2$, $h_2$, $w_2$] and the (1_2)-nd intermediate feature map 204_1 in a form of [$f_2$, $h_2$, $w_2$].

The second fused point-cloud map 202_2 may be generated by applying the mapping operation to the second fused feature map 201_2 created as above, and the mapping operation may correlate each of the feature values included in the second fused feature map 201_2 with each point in a 3D space near the radar/LiDAR 400. Using the notation aforementioned again, if the second fused feature map 201_2 is in a form of [$c_2+f_2$, $h_2$, $w_2$], the second fused point-cloud map 202_2 may be in a form of $[c_2+f_2, M]$. That is, each of the feature values included in the second fused feature map 201_2 may be correlated with each of the coordinates as included in the original point-cloud map and the first fused point-cloud map 202_1.

If the second fused feature map 201_2 and the second fused point-cloud map 202_2 are generated as above, the computing device 100 may instruct the transformation layer 220 and the integration layer 230 to generate a third fused feature map (not illustrated) and a third fused point-cloud map (not illustrated) by applying operations, which have been applied to the first fused feature map 201_1 and the first fused point-cloud map 202_1, to the second fused feature map 201_2 and the second fused point-cloud map 202_2. If an N-th fused feature map 201_N and an N-th fused point cloud map 202_N are generated by repeating these processes, the computing device 100 may generate an (N_1)-st intermediate feature map 203_N by applying the first transformation operation to the N-th fused feature map 201_N, may generate an (N_2)-nd intermediate feature map 204_N by applying the second transformation operation to the N-th fused point-cloud map 202_N, may generate an (N+1)-th fused feature map 201_(N+1) by integrating the (N_1)-st intermediate feature map 203_N and the (N_2)-nd intermediate feature map 204_N, and may generate an (N+1)-th fused point-cloud map 202_(N+1) by applying the mapping operation to the (N+1)-th fused feature map 201_(N+1).

Thereafter, the computing device 100 may instruct the output layer 240 to perform at least part of operations required for autonomous driving, such as an object detection, a semantic segmentation, a depth estimation and the like, by referring to at least part of the (N+1)-th fused feature map 201_(N+1) and the (N+1)-th fused point-cloud map 202_(N+1). As another example, the computing device 100 may instruct the output layer 240 to use a previous fused feature map and a previous fused point-cloud map generated at a previous step, instead of using the (N+1)-th fused feature map 201_(N+1) and the (N+1)-th fused point-cloud map 202_(N+1).

Then, if at least one output of the neural network 200 is created by the output layer 240, the computing device 100 may calculate one or more losses by referring to the output and its at least one corresponding GT and may learn at least part of one or more parameters of the neural network 200 by referring to the losses.

As a result, the parameters of the convolution operation and the neural network operation may be optimized according to calculations required for an autonomous vehicle.

The learning method of the computing device 100 is described above, and a testing process of the computing device 100 is described below. Below, terms like "the learning device" and "a testing device" are used in place of the computing device 100, and the computing device 100 before completion of the learning process may be the learning device, and the computing device 100 after the completion of the learning process may be the testing device.

For reference, in the description below, the phrase "for training" or "training" is added for terms related to the learning process, and the phrase "for testing" or "testing" is added for terms related to a testing process, to avoid possible confusion.

On condition that (1) the learning device 100 has performed processes of instructing the initial operation layer 210 to integrate at least one original training image generated by the camera 300 and its corresponding at least one original point-cloud map for training generated by the radar/LiDAR 400, to thereby generate (i) at least one first fused feature map for training by adding depth information for training included in the original point-cloud map for training to the original training image and (ii) at least one first fused point-cloud map for training by adding color information for training included in the original training image to the original point-cloud map for training; (2) the learning device 100 has performed processes of instructing the transformation layer 220 to generate a (1_1)-st intermediate feature map for training by applying the first transformation operation to the first fused feature map for training, and to generate a (1_2)-nd intermediate feature map for training by applying the second transformation operation to the first fused point-cloud map for training; (3) the learning device 100 has performed processes of instructing the integration layer 230 to generate a second fused feature map for training by integrating the (1_1)-st intermediate feature map for training and the (1_2)-nd intermediate feature map for training, and to generate a second fused point-cloud map for training by applying the mapping operation to the second fused feature map for training; (4) the learning device 100, as a result of repeating the steps of (2) and (3), has performed processes of (i) instructing the transformation layer 220 to generate an (N_1)-st intermediate feature map for training by applying the first transformation operation to an N-th fused feature map for training created by the integration layer 230, to generate an (N_2)-nd intermediate feature map for training by applying the second transformation operation to an N-th fused point-cloud map for training created by the integration layer 230, (ii) instructing the integration layer 230 to generate an (N+1)-th fused feature map for training by integrating the (N_1)-st intermediate feature map for training and the (N_2)-nd intermediate feature map for training, and to generate an (N+1)-th fused point-cloud map for training by applying the mapping operation to the (N+1)-th fused feature map for training; (5) the learning device 100 has performed processes of instructing the output layer 240 to perform at least part of operations required for autonomous driving which include at least part of the object detection, the semantic segmentation and the depth estimation, by referring to at least part of the (N+1)-th fused feature map for training and the (N+1)-th fused point-cloud map for training; and (6) the learning device 100 has learned at least part of the parameters of the neural network by referring to at least one output of the neural network 200 created by the output layer 240 and at least one GT corresponding to the output, a testing device may instruct the initial operation layer 210 to integrate at least one original test image generated by the camera 300 and its corresponding at least one original point-cloud map for testing generated by the radar/LiDAR 400, to thereby generate (i) at least one first fused feature map for testing by adding depth information for testing included in the original point-cloud map for testing to the original test image and (ii) at least one first fused point-cloud map for testing by adding color information for testing included in the original test image to the original point-cloud map for testing.

Then, the testing device may instruct the transformation layer 220 to generate a (1_1)-st intermediate feature map for testing by applying the first transformation operation to the first fused feature map for testing, and to generate a (1_2)-nd intermediate feature map for testing by applying the second transformation operation to the first fused point-cloud map for testing.

Further, the testing device may instruct the integration layer 230 to generate a second fused feature map for testing by integrating the (1_1)-st intermediate feature map for testing and the (1_2)-nd intermediate feature map for testing, and to generate a second fused point-cloud map for testing by applying the mapping operation to the second fused feature map for testing.

Thereafter, as a result of repeating the steps of (b) and (c), the testing device may perform processes of (i) instructing the transformation layer 220 to generate an (N_1)-st intermediate feature map for testing by applying the first transformation operation to an N-th fused feature map for testing created by the integration layer 230, to generate an (N_2)-nd intermediate feature map for testing by applying the second transformation operation to an N-th fused point-cloud map for testing created by the integration layer 230, (ii) instructing the integration layer 230 to generate an (N+1)-th fused feature map for testing by integrating the (N_1)-st intermediate feature map for testing and the (N_2)-nd intermediate feature map for testing, and to generate an (N+1)-th fused point-cloud map for testing by applying the mapping operation to the (N+1)-th fused feature map for testing.

Further, the testing device may instruct the output layer 240 to perform at least part of operations required for autonomous driving which include at least part of the object detection, the semantic segmentation and the depth estimation, by referring to at least part of the (N+1)-th fused feature map for testing and the (N+1)-th fused point-cloud map for testing.

By referring to the parameters optimized as such according to the calculations required for the autonomous vehicle, and by integrating and using the point-cloud map generated by the radar/LiDAR 400 and the image generated by the camera 300, the neural network 200 shows better performance.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The present disclosure has an effect of enabling a CNN to integrate and compute information generated by the camera and information generated by the radar, the LiDAR, or a heterogeneous sensor fusion by providing the method for integrating, at each convolution stage in the neural network, the image generated by the camera and its corresponding point-cloud map generated by the radar, the LiDAR, or a heterogeneous sensor fusion.

The method in accordance with the present disclosure may be used for an HD map update, and may improve an object detection and a segmentation with a distance estimation.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for integrating, at each convolution stage in a neural network, at least one image generated by at least one camera and its corresponding at least one point-cloud map generated by at least one radar or at least one LiDAR, comprising steps of:

(a) a computing device instructing at least one initial operation layer to integrate at least one original image generated by the camera and its corresponding at least one original point-cloud map generated by the radar or the LiDAR, to thereby generate (i) at least one first fused feature map by adding depth information included in the original point-cloud map to the original image and (ii) at least one first fused point-cloud map by adding color information included in the original image to the original point-cloud map;

(b) the computing device instructing at least one transformation layer to generate a (1_1)-st intermediate feature map by applying at least one first transformation operation to the first fused feature map, and to generate a (1_2)-nd intermediate feature map by applying at least one second transformation operation to the first fused point-cloud map; and (c) the computing device instructing at least one integration layer to generate a second fused feature map by integrating the (1_1)-st intermediate feature map and the (1_2)-nd intermediate feature map, and to generate a second fused point-cloud map by applying at least one mapping operation to the second fused feature map.

2. The method of claim 1, wherein the method further comprises a step of:

(d) the computing device, as a result of repeating the steps of (b) and (c), (i) instructing the transformation layer to generate an (N_1)-st intermediate feature map by applying the first transformation operation to an N-th fused feature map created by the integration layer, to generate an (N_2)-nd intermediate feature map by applying the second transformation operation to an N-th fused point-cloud map created by the integration layer, and (ii) instructing the integration layer to generate an (N+1)-th fused feature map by integrating the (N_1)-st intermediate feature map and the (N_2)-nd intermediate feature map, and to generate an (N+1)-th fused point-cloud map by applying the mapping operation to the (N+1)-th fused feature map.

3. The method of claim 2, wherein the method further comprises a step of:
(e) the computing device instructing at least one output layer to perform at least part of operations required for autonomous driving which include at least part of an object detection, a semantic segmentation and a depth estimation, by referring to at least part of the (N+1)-th fused feature map and the (N+1)-th fused point-cloud map.

4. The method of claim 3, wherein the method further comprises a step of:
(f) the computing device, if at least one output of the neural network created by the output layer is generated, learning at least part of one or more parameters of the neural network by referring to the output and its at least one corresponding GT.

5. The method of claim 1, wherein, at the step of (a), the first fused feature map includes (i) original color information, on each pixel, in the original image, and (ii) the depth information on the each pixel, generated by referring to original coordinate information on each position in a three dimensional space near the radar or the LiDAR wherein the each position is included in the original point-cloud map, and wherein the first fused point-cloud map includes (i) the original coordinate information and (ii) the color information on the each position acquired by referring to the original color information.

6. The method of claim 1, wherein, at the step of (b), the (1_1)-st intermediate feature map is generated by applying the first transformation operation including at least one convolution operation to the first fused feature map.

7. The method of claim 6, wherein, at the step of (b), the (1_1)-st intermediate feature map is generated by applying the first transformation operation further including at least one ReLU operation and at least one pooling operation to the first fused feature map.

8. The method of claim 1, wherein, at the step of (b), the (1_2)-nd intermediate feature map is generated by applying the second transformation operation including at least one neural network operation, at least one inverse mapping operation, and at least one convolution operation to the first fused point-cloud map, and
wherein the inverse mapping operation correlates (i) the depth information, included in the first fused point-cloud map, in a form of three dimensional coordinates linked with the color information with (ii) each of features in the (1_1)-st intermediate feature map.

9. The method of claim 1, wherein, at the step of (c), the second fused feature map is generated by concatenating the (1_1)-st intermediate feature map and the (1_2)-nd intermediate feature map in a direction of a channel.

10. The method of claim 1, wherein, at the step of (c), the mapping operation correlates (i) each of feature values in the second fused feature map with (ii) each position in a three dimensional space near the radar or the LiDAR.

11. A method for testing and using integration of, at each convolution stage in a neural network, at least one image generated by at least one camera and its corresponding at least one point-cloud map generated by at least one radar or at least one LiDAR, comprising steps of:
(a) a testing device, on condition that (1) a learning device has performed processes of instructing at least one initial operation layer to integrate at least one original training image generated by the camera and its corresponding at least one original point-cloud map for training generated by the radar or the LiDAR, to thereby generate (i) at least one first fused feature map for training by adding depth information for training included in the original point-cloud map for training to the original training image and (ii) at least one first fused point-cloud map for training by adding color information for training included in the original training image to the original point-cloud map for training, (2) the learning device has performed processes of instructing at least one transformation layer to generate a (1_1)-st intermediate feature map for training by applying at least one first transformation operation to the first fused feature map for training, and to generate a (1_2)-nd intermediate feature map for training by applying at least one second transformation operation to the first fused point-cloud map for training, (3) the learning device has performed processes of instructing at least one integration layer to generate a second fused feature map for training by integrating the (1_1)-st intermediate feature map for training and the (1_2)-nd intermediate feature map for training, and to generate a second fused point-cloud map for training by applying at least one mapping operation to the second fused feature map for training, (4) the learning device, as a result of repeating the steps of (2) and (3), has performed processes of (i) instructing the transformation layer to generate an (N_1)-st intermediate feature map for training by applying the first transformation operation to an N-th fused feature map for training created by the integration layer, to generate an (N_2)-nd intermediate feature map for training by applying the second transformation operation to an N-th fused point-cloud map for training created by the integration layer, (ii) instructing the integration layer to generate an (N+1)-th fused feature map for training by integrating the (N_1)-st intermediate feature map for training and the (N_2)-nd intermediate feature map for training, and to generate an (N+1)-th fused point-cloud map for training by applying the mapping operation to the (N+1)-th fused feature map for training, (5) the learning device has performed processes of instructing at least one output layer to perform at least part of operations required for autonomous driving which include at least part of an object detection, a semantic segmentation and a depth estimation, by referring to at least part of the (N+1)-th fused feature map for training and the (N+1)-th fused point-cloud map for training, and (6) the learning device has learned at least part of one or more parameters of the neural network by referring to at least one output of the neural network created by the output layer and at least one GT corresponding to the output; instructing the initial operation layer to integrate at least one original test image generated by the camera and its corresponding at least one original point-cloud map for testing generated by the radar or the LiDAR, to thereby generate (i) at least one first fused feature map for testing by adding depth information for testing included in the original point-cloud map for testing to the original test image and (ii) at least one first fused point-cloud map for testing by adding color information for testing included in the original test image to the original point-cloud map for testing;
(b) the testing device instructing the transformation layer to generate a (1_1)-st intermediate feature map for testing by applying the first transformation operation to the first fused feature map for testing, and to generate a (1_2)-nd intermediate feature map for testing by applying the second transformation operation to the first fused point-cloud map for testing;
(c) the testing device instructing the integration layer to generate a second fused feature map for testing by integrating the (1_1)-st intermediate feature map for testing and the (1_2)-nd intermediate feature map for testing, and to generate a second fused point-cloud map for testing by applying the mapping operation to the second fused feature map for testing;
(d) the testing device, as a result of repeating the steps of (b) and (c), (i) instructing the transformation layer to generate an (N_1)-st intermediate feature map for testing by applying the first transformation operation to an N-th fused feature map for testing created by the integration layer, to generate an (N_2)-nd intermediate feature map for testing by applying the second transformation operation to an N-th fused point-cloud map for testing created by the integration layer, (ii) instructing the integration layer to generate an (N+1)-th fused feature map for testing by integrating the (N_1)-st intermediate feature map for testing and the (N_2)-nd intermediate feature map for testing, and to generate an (N+1)-th fused point-cloud map for testing by applying the mapping operation to the (N+1)-th fused feature map for testing; and
(e) the testing device instructing the output layer to perform at least part of operations required for autonomous driving which include at least part of the object detection, the semantic segmentation and the depth estimation, by referring to at least part of the (N+1)-th fused feature map for testing and the (N+1)-th fused point-cloud map for testing.

12. A computing device for integrating, at each convolution stage in a neural network, at least one image generated by at least one camera and its corresponding at least one point-cloud map generated by at least one radar or at least one LiDAR, comprising:
at least one memory that stores instructions; and
at least one processor configured to execute the instructions to: perform processes of (I) instructing at least one initial operation layer to integrate at least one original image generated by the camera and its corresponding at least one original point-cloud map generated by the radar or the LiDAR, to thereby generate (i) at least one first fused feature map by adding depth information included in the original point-cloud map to the original image and (ii) at least one first fused point-cloud map by adding color information included in the original image to the original point-cloud map, (II) instructing at least one transformation layer to generate a (1_1)-st intermediate feature map by applying at least one first transformation operation to the first fused feature map, and to generate a (1_2)-nd intermediate feature map by applying at least one second transformation operation to the first fused point-cloud map, and (III) instructing at least one integration layer to generate a second fused feature map by integrating the (1_1)-st intermediate feature map and the (1_2)-nd intermediate feature map, and to generate a second fused point-cloud map by applying at least one mapping operation to the second fused feature map.

13. The computing device of claim 12, wherein the processor further performs a process of (IV), as a result of repeating the processes of (II) and (III), (i) instructing the transformation layer to generate an (N_1)-st intermediate feature map by applying the first transformation operation to an N-th fused feature map created by the integration layer, to generate an (N_2)-nd intermediate feature map by applying the second transformation operation to an N-th fused point-cloud map created by the integration layer, and (ii) instructing the integration layer to generate an (N+1)-th fused feature map by integrating the (N_1)-st intermediate feature map and the (N_2)-nd intermediate feature map, and to generate an (N+1)-th fused point-cloud map by applying the mapping operation to the (N+1)-th fused feature map.

14. The computing device of claim 13, wherein the processor further performs a process of (V) instructing at least one output layer to perform at least part of operations required for autonomous driving which include at least part of an object detection, a semantic segmentation and a depth estimation, by referring to at least part of the (N+1)-th fused feature map and the (N+1)-th fused point-cloud map.

15. The computing device of claim 14, wherein the processor further performs a process of (VI), if at least one output of the neural network created by the output layer is generated, learning at least part of one or more parameters of the neural network by referring to the output and its at least one corresponding GT.

16. The computing device of claim 12, wherein, at the process of (I), the first fused feature map includes (i) original color information, on each pixel, in the original image, and (ii) the depth information on the each pixel, generated by referring to original coordinate information on each position in a three dimensional space near the radar or the LiDAR wherein the each position is included in the original point-cloud map, and wherein the first fused point-cloud map includes (i) the original coordinate information and (ii) the color information on the each position acquired by referring to the original color information.

17. The computing device of claim 12, wherein, at the process of (II), the (1_1)-st intermediate feature map is generated by applying the first transformation operation including at least one convolution operation to the first fused feature map.

18. The computing device of claim 17, wherein, at the process of (II), the (1_1)-st intermediate feature map is generated by applying the first transformation operation further including at least one ReLU operation and at least one pooling operation to the first fused feature map.

19. The computing device of claim 12, wherein, at the process of (II), the (1_2)-nd intermediate feature map is generated by applying the second transformation operation including at least one neural network operation, at least one inverse mapping operation, and at least one convolution operation to the first fused point-cloud map, and
wherein the inverse mapping operation correlates (i) the depth information, included in the first fused point-cloud map, in a form of three dimensional coordinates linked with the color information with (ii) each of features in the (1_1)-st intermediate feature map.

20. The computing device of claim 12, wherein, at the process of (III), the second fused feature map is generated by concatenating the (1_1)-st intermediate feature map and the (1_2)-nd intermediate feature map in a direction of a channel.

21. The computing device of claim 12, wherein, at the process of (III), the mapping operation correlates (i) each of feature values in the second fused feature map with (ii) each position in a three dimensional space near the radar or the LiDAR.

22. A testing device for testing and using integration of, at each convolution stage in a neural network, at least one image generated by at least one camera and its corresponding at least one point-cloud map generated by at least one radar or at least one LiDAR, comprising:

at least one memory that stores instructions; and at least one processor, on condition that (1) a learning device has performed processes of instructing at least one initial operation layer to integrate at least one original training image generated by the camera and its corresponding at least one original point-cloud map for training generated by the radar or the LiDAR, to thereby generate (i) at least one first fused feature map for training by adding depth information for training included in the original point-cloud map for training to the original training image and (ii) at least one first fused point-cloud map for training by adding color information for training included in the original training image to the original point-cloud map for training, (2) the learning device has performed processes of instructing at least one transformation layer to generate a (1_1)-st intermediate feature map for training by applying at least one first transformation operation to the first fused feature map for training, and to generate a (1_2)-nd intermediate feature map for training by applying at least one second transformation operation to the first fused point-cloud map for training, (3) the learning device has performed processes of instructing at least one integration layer to generate a second fused feature map for training by integrating the (1_1)-st intermediate feature map for training and the (1_2)-nd intermediate feature map for training, and to generate a second fused point-cloud map for training by applying at least one mapping operation to the second fused feature map for training, (4) the learning device, as a result of repeating the steps of (2) and (3), has performed processes of (i) instructing the transformation layer to generate an (N_1)-st intermediate feature map for training by applying the first transformation operation to an N-th fused feature map for training created by the integration layer, to generate an (N_2)-nd intermediate feature map for training by applying the second transformation operation to an N-th fused point-cloud map for training created by the integration layer, (ii) instructing the integration layer to generate an (N+1)-th fused feature map for training by integrating the (N_1)-st intermediate feature map for training and the (N_2)-nd intermediate feature map for training, and to generate an (N+1)-th fused point-cloud map for training by applying the mapping operation to the (N+1)-th fused feature map for training, (5) the learning device has performed processes of instructing at least one output layer to perform at least part of operations required for autonomous driving which include at least part of an object detection, a semantic segmentation and a depth estimation, by referring to at least part of the (N+1)-th fused feature map for training and the (N+1)-th fused point-cloud map for training, and (6) the learning device has learned at least part of one or more parameters of the neural network by referring to at least one output of the neural network created by the output layer and at least one GT corresponding to the output; configured to execute the instructions to: perform processes of (I) instructing the initial operation layer to integrate at least one original test image generated by the camera and its corresponding at least one original point-cloud map for testing generated by the radar or the LiDAR, to thereby generate (i) at least one first fused feature map for testing by adding depth information for testing included in the original point-cloud map for testing to the original test image and (ii) at least one first fused point-cloud map for testing by adding color information for testing included in the original test image to the original point-cloud map for testing, (II) instructing the transformation layer to generate a (1_1)-st intermediate feature map for testing by applying the first transformation operation to the first fused feature map for testing, and to generate a (1_2)-nd intermediate feature map for testing by applying the second transformation operation to the first fused point-cloud map for testing, (III) instructing the integration layer to generate a second fused feature map for testing by integrating the (1_1)-st intermediate feature map for testing and the (1_2)-nd intermediate feature map for testing, and to generate a second fused point-cloud map for testing by applying the mapping operation to the second fused feature map for testing, (IV) as a result of repeating the processes of (II) and (III), (i) instructing the transformation layer to generate an (N_1)-st intermediate feature map for testing by applying the first transformation operation to an N-th fused feature map for testing created by the integration layer, to generate an (N_2)-nd intermediate feature map for testing by applying the second transformation operation to an N-th fused point-cloud map for testing created by the integration layer, (ii) instructing the integration layer to generate an (N+1)-th fused feature map for testing by integrating the (N_1)-st intermediate feature map for testing and the (N_2)-nd intermediate feature map for testing, and to generate an (N+1)-th fused point-cloud map for testing by applying the mapping operation to the (N+1)-th fused feature map for testing, and (V) instructing the output layer to perform at least part of operations required for autonomous driving which include at least part of the object detection, the semantic segmentation and the depth estimation, by referring to at least part of the (N+1)-th fused feature map for testing and the (N+1)-th fused point-cloud map for testing.

* * * * *